US010175750B1

(12) United States Patent
Worley, III et al.

(10) Patent No.: US 10,175,750 B1
(45) Date of Patent: Jan. 8, 2019

(54) PROJECTED WORKSPACE

(71) Applicants:William Spencer Worley, III, Half Moon Bay, CA (US); Edward Dietz Crump, Santa Cruz, CA (US); Christopher D. Coley, Morgan Hill, CA (US)

(72) Inventors: William Spencer Worley, III, Half Moon Bay, CA (US); Edward Dietz Crump, Santa Cruz, CA (US); Christopher D. Coley, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 13/624,477

(22) Filed: Sep. 21, 2012

(51) Int. Cl.
| | |
|---|---|
| *G06F 3/01* | (2006.01) |
| *G06F 3/0488* | (2013.01) |
| *G09G 3/34* | (2006.01) |
| *G09G 3/20* | (2006.01) |
| *G06T 19/00* | (2011.01) |

(52) U.S. Cl.
CPC .......... *G06F 3/011* (2013.01); *G06F 3/04883* (2013.01); *G09G 3/344* (2013.01); *G06T 19/006* (2013.01); *G09G 3/2003* (2013.01)

(58) Field of Classification Search
CPC ..... G06F 3/011; G06F 3/04883; G09G 3/344; G06T 19/066
USPC .......................................................... 345/158
See application file for complete search history.

(56) References Cited

U.S. PATENT DOCUMENTS

| | | | | |
|---|---|---|---|---|
| 6,181,343 B1* | 1/2001 | Lyons | ..................... | A63F 13/10 715/850 |
| 6,353,885 B1* | 3/2002 | Herzi | ..................... | G06F 9/4411 713/1 |
| 6,751,655 B1* | 6/2004 | Deutsch et al. | ............. | 709/219 |
| 7,120,785 B1* | 10/2006 | Bowers | ................ | G06F 9/4451 713/1 |
| 8,662,676 B1* | 3/2014 | Chang et al. | ................... | 353/69 |
| 8,686,958 B2* | 4/2014 | Rutledge et al. | ............ | 345/173 |
| 8,704,764 B2* | 4/2014 | Zhang et al. | ................. | 345/156 |
| 8,715,087 B2* | 5/2014 | Rouille | .......................... | 463/42 |
| 8,761,811 B2* | 6/2014 | Alonzo | ........................ | 455/457 |
| 8,773,468 B1* | 7/2014 | Ballagh et al. | .............. | 345/634 |
| 8,791,928 B2* | 7/2014 | Chen et al. | ................... | 345/204 |
| 8,799,997 B2* | 8/2014 | Spiers et al. | ..................... | 726/3 |
| 8,803,876 B2* | 8/2014 | Bohan et al. | ................. | 345/419 |
| 9,110,756 B1* | 8/2015 | Guo | ......................... | G06F 8/65 |

(Continued)

FOREIGN PATENT DOCUMENTS

WO    WO2011088053    7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Sejoon Ahn
(74) *Attorney, Agent, or Firm* — Lee & Hayes, P.C.

(57) ABSTRACT

Techniques for providing a container that is accessible to at least a first user within a multiple user environment. The container has predetermined access attributes for the first user, and for other potential users within the environment, and the container can be portable across a network and accessible to the first user within either single user or multiple user environments.

25 Claims, 7 Drawing Sheets

(56) References Cited

U.S. PATENT DOCUMENTS

| | | | | |
|---|---|---|---|---|
| 2005/0149467 A1* | 7/2005 | Ono | A63F 13/10 | 706/61 |
| 2007/0035764 A1* | 2/2007 | Aldrich | G06F 17/3028 | 358/1.15 |
| 2007/0113181 A1* | 5/2007 | Blattner | G06F 3/011 | 715/706 |
| 2008/0080748 A1* | 4/2008 | Sukegawa | G06K 9/00288 | 382/118 |
| 2009/0098910 A1* | 4/2009 | Roh | G06F 3/0486 | 455/566 |
| 2009/0172046 A1* | 7/2009 | Kodama | G06F 11/1451 | |
| 2009/0300190 A1* | 12/2009 | Williamson | G06F 21/31 | 709/227 |
| 2010/0075749 A1* | 3/2010 | Seshadri | A63F 13/10 | 463/29 |
| 2010/0182220 A1* | 7/2010 | Bathiche | G06F 3/01 | 345/7 |
| 2010/0228632 A1* | 9/2010 | Rodriguez | G06F 3/011 | 705/14.66 |
| 2010/0318904 A1* | 12/2010 | Hillis et al. | | 715/701 |
| 2011/0102401 A1* | 5/2011 | Feng | | 345/211 |
| 2011/0246766 A1* | 10/2011 | Orsini | G06F 11/1076 | 713/160 |
| 2011/0267298 A1* | 11/2011 | Erhart | G06F 1/1626 | 345/173 |
| 2011/0309919 A1* | 12/2011 | Tidemand | G06F 3/011 | 340/407.1 |
| 2011/0314497 A1* | 12/2011 | Warrick | H04W 76/02 | 725/38 |
| 2012/0032945 A1* | 2/2012 | Dare | G06F 3/0481 | 345/418 |
| 2012/0033026 A1* | 2/2012 | Murphy | H04N 7/147 | 348/14.01 |
| 2012/0066277 A1* | 3/2012 | Ubukata | G06F 17/30085 | 707/827 |
| 2012/0185683 A1* | 7/2012 | Krstic | G06F 21/44 | 713/2 |
| 2012/0223885 A1 | 9/2012 | Perez | | |
| 2012/0249287 A1* | 10/2012 | Levien | G09G 5/00 | 340/5.1 |
| 2013/0160141 A1* | 6/2013 | Tseng | G06F 21/6245 | 726/28 |
| 2013/0257751 A1* | 10/2013 | Stafford | G06F 3/0488 | 345/173 |
| 2013/0275850 A1* | 10/2013 | Cudak | G06F 17/30867 | 715/234 |
| 2014/0049462 A1* | 2/2014 | Weinberger | G06F 3/013 | 345/156 |

* cited by examiner

PROJECTED WORKSPACE

BACKGROUND

User interfaces have traditionally relied on input devices such as keyboards and dedicated active displays such as electronic monitors. Increasingly, however, it is desired to interact with users in more natural ways, such as by projecting or displaying content onto various surfaces, either active or passive surfaces (such as walls) and by reacting to speech, gestures and tactile movements of users.

In a multiple-user workspace, there may be users that have different interfaces and discrete applications they are individually working on. The users may desire to individually save data and start and end interaction independently of each other within the workspace. Moreover, the users may have different privileges and rights to access other user interfaces within the common workspace.

BRIEF DESCRIPTION OF THE DRAWINGS

In the accompanying figures, the left-most digit(s) of a reference number identifies the figure in which the reference number first appears. The use of the same reference numbers in different figures indicates similar or identical components or features.

DETAILED DESCRIPTION

Described herein are systems and methods that provide a container that is accessible to at least a first user within a multiple user environment. The container has predetermined access attributes for the first user and for other potential users within the environment, and the container can be portable across a network and accessible to the first user within either single user or multiple user environments.

As described in detail below, the system can create a multiple user environment that is interactive to one or more users, and the environment is monitored for the presence of users. The system detects a first user within the environment and, in response to detecting the first user, identifies at least one container for the first user, with the container having predetermined access attributes for other users within the environment. The system can then selectively display the container within the environment such that the container is accessible to at least the first user. In one embodiment, the system can project content onto a current display area within the environment using a projector and may capture images of the environment, including images of any user within the environment attempting to interact with the container.

The container can be a virtual machine instance, a data storage structure, or other object having semi or full permanence. The container can be retrieved from a local device or network-based resources, such as cloud-based storage, and can be saved back to the network-based resources for later use by the users at different environments. The container may also be executed locally on a system that creates the environment, on a separate local device, or on remote processing resources such as cloud-based processing resources. In this manner, storage and execution of the container is not necessarily associated with the location at which the user views the container contents.

The system can determine if a second user attempts to interact with the container in the environment, and will selectively allow access to second user to the container based upon the predetermined access attributes of the container. The container can be selectively displayed within the environment, in a designated area thereof, such as on a board or other defined physical region. The system can also authenticate the user before displaying the container within the environment, such as through using biometrics, hand gestures, electronic devices, and other means.

Figure 1:
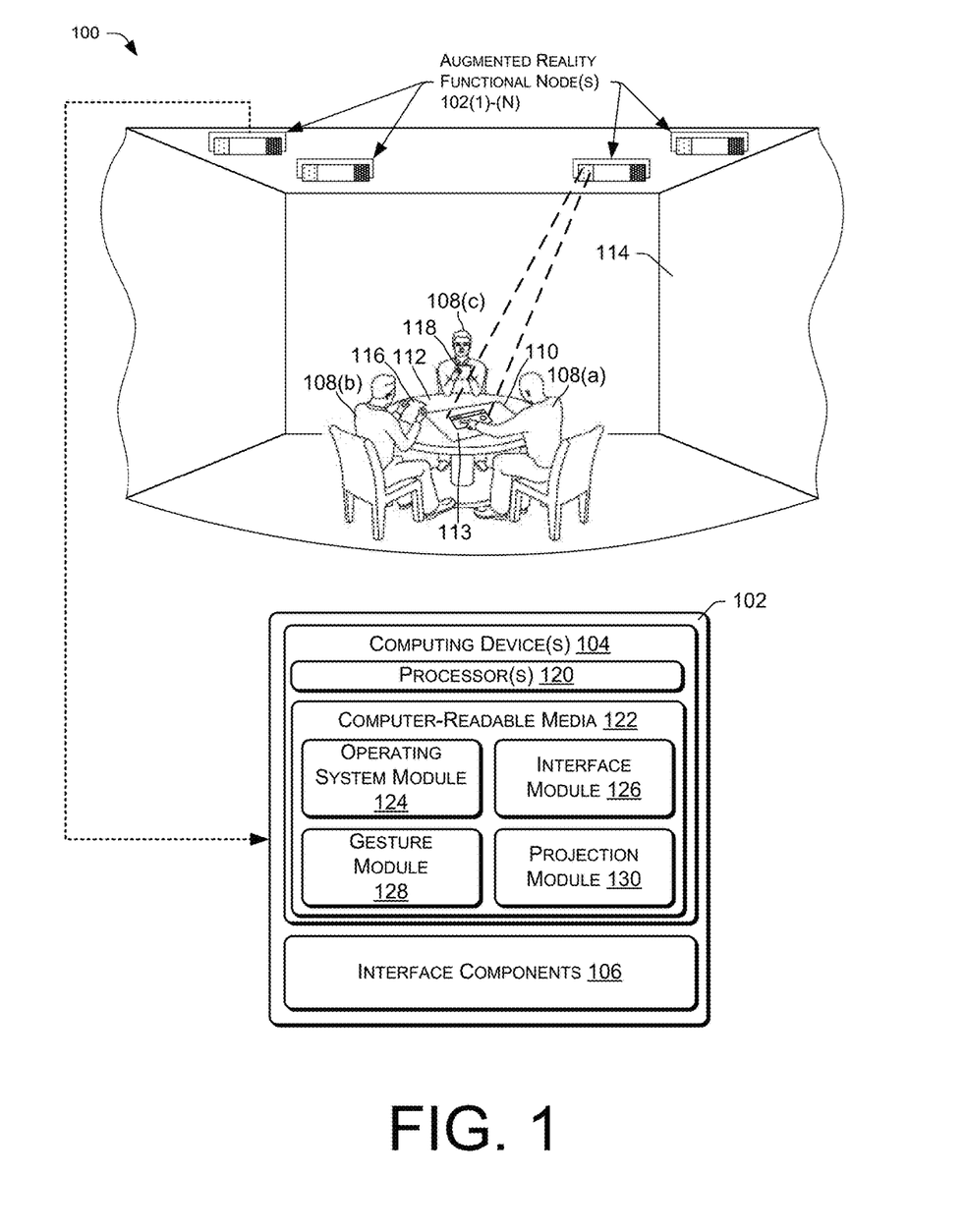
FIG. 1 illustrates an environment that includes an augmented reality functional node (ARFN) that projects content onto a display area having multiple users.

FIG. 1 shows an illustrative environment 100 in which the described systems and techniques may be implemented. Similar functionality may also be provided in other environments that are projection based, touch-screen based, or are otherwise interactive to multiple users.

The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices.

As illustrated, each ARFN 102 may include one or more computing devices 104, as well as one or more interface components 106. The computing devices 104 and interface components 106 may be configured in conjunction with each other to interact with one or more users 108 within the environment 100. As an example, a visual workspace 110 may be projected onto a tabletop 112, and the user may interact with the ARFN 102 by using his or her hand. The workspace 110 may comprise content such as books, drawings, illustrations, movies, photographs, user interfaces, interactive menus, and so forth.

The environment 100 may have multiple potential display areas or locations, which may include passive objects and active devices. As an example of passive areas, the environment 100 may have or contain one or more surfaces upon which content may be projected. For example, content may be projected onto the tabletop 112 as shown, or onto walls 114 of the environment. As another example, a user 108(b) may hold a passive display medium 116, such as a sheet of paper, upon which content may be projected. A user's hand is another example of a passive media upon which content may be projected.

Here, an instance of a user-specific container 113 is displayed from an AFRN 102 onto the tabletop 112 workspace 110. In this embodiment, the AFRN 102 can have a local copy of the container 113, created upon request by user 108(a), possibly through an appropriate gesture or voice command. Conversely, the AFRN 102 can retrieve the container 113 from a network-based storage, as is further described herein. In either instance, the user 108(a) interacts with the instance of the container 113, and the other users 108(b) and 108(c) can potentially reach into the workspace 110 and attempt to interact with the container 113. The rules dictating the potential access to the container 113 within a multiple user workspace 110 by other users can be predetermined prior to display/access of the container 113, or can be set and updated as the user 108(a) desires during interactions with the container 113. Such embodiments are further described herein.

As an example of active media, a user 108(c) may hold or use a computer-like device 118 such as a tablet computer, smartphone, laptop computer, book reader, desktop computer, or other electronic device capable of displaying images or other content.

Generally, potential display areas within an environment may include furniture; handheld objects and devices; structural surfaces such as walls, floors, and ceilings; active devices such as monitors, televisions, projectors, computers, personal electronic devices; and other objects or devices having planar or non-planar surfaces.

The computing device 104 of the example ARFN 102 may include one or more processors 120 and computer-readable media 122. The processor(s) 120 may be configured to execute instructions, which may be stored in the computer-readable media 122 or in other computer-readable media accessible to the processor(s) 120. The processor(s) 120 may include digital signal processors (DSPs).

The computer-readable media 122 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 122 may reside within a housing of the ARFN 102, on one or more storage devices accessible on a local network, on cloud storage accessible via a wide area network, or in any other accessible location.

The computer-readable media 122 may store various modules, such as instructions, data stores, and so forth that are configured to execute on the processor(s) 120. For instance, the computer-readable media 122 may store an operating system module 124 and an interface module 126.

The operating system module 124 may be configured to manage hardware and services within and coupled to the computing device 104 for the benefit of other modules. The interface module 126 may be configured to receive and interpret commands from users within the environment 100, and to respond to such commands in various ways.

The computer-readable media 122 may include a gesture module 128 that uses various capabilities of the ARFN 102 to detect and recognize gestures or other actions performed by the users 108 in the environment 100. The gesture module 128 may perform various types of image processing, including three-dimensional environment analysis, to detect gestures. The computer-readable media 122 may also include a projection module 130 that controls projection of visual content within the environment.

These various modules implemented by the computing device 104, as well as other modules not shown, may be configured collectively to perform the techniques described herein for recognizing user gestures, presenting content, and controlling the selection of display areas upon which workspace content is presented.

The ARFN 102 may include various interface components 106, such as user interface components and other components, which may be used to detect and evaluate conditions and events within the environment 100. The interface components 106 may in certain implementations include various types of sensors and transducers, content generation devices, and so forth, examples of which will be described below with reference to FIG. 2.

Figure 2:
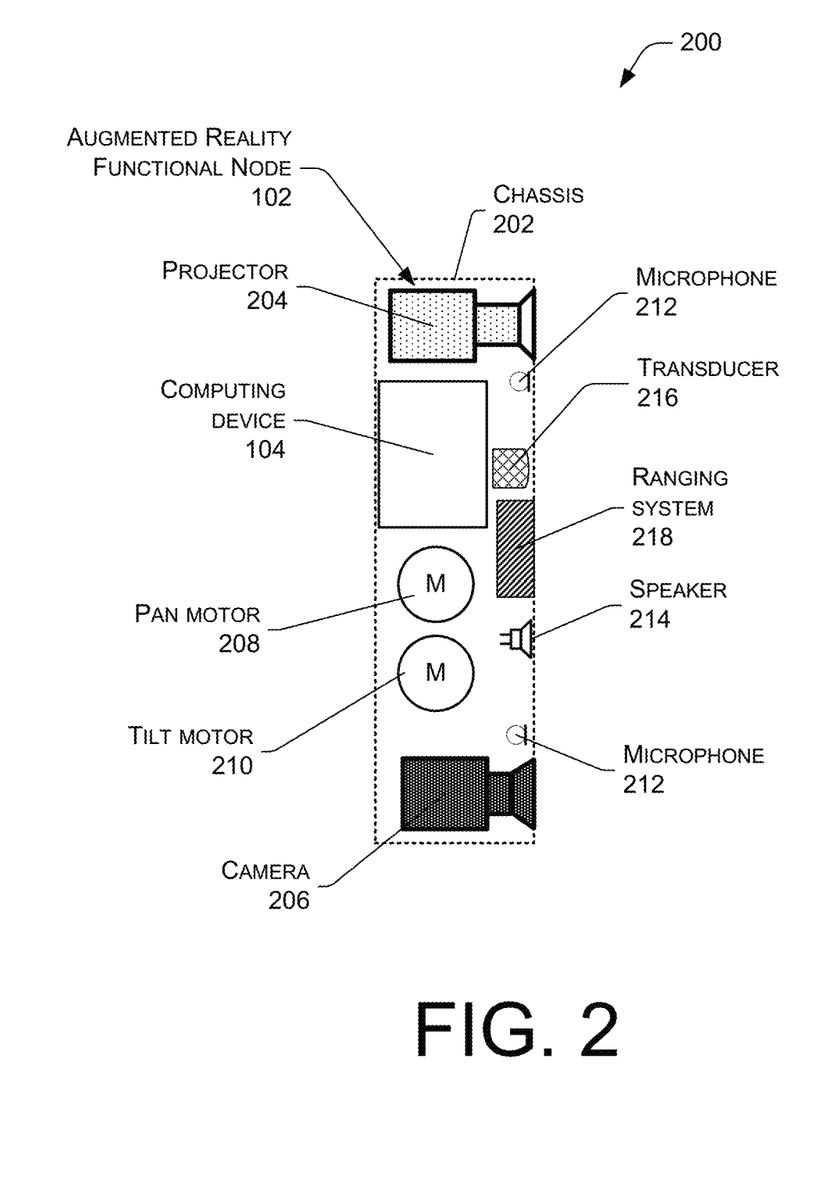
FIG. 2 illustrates an example ARFN that includes a computing device, a projector, a camera, and other selected components for allowing a user to interact with the ARFN.

FIG. 2 shows an illustrative schematic 200 of the ARFN 102 and selected components in greater detail. The ARFN 102 is configured to scan and analyze at least a portion of the environment 100. The ARFN 102 may also be configured to provide output, including user-perceptible output such as video and audio.

A chassis 202 holds the components of the ARFN 102. Within the chassis 202 may be disposed a projector 204 that generates and projects images onto display areas within the environment 100. These images may be visible light images perceptible to a user, non-visible light images imperceptible to users (such as infrared images), or combinations thereof. The projector 204 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. In some implementations, a plurality of projectors 204 may be used.

A camera or other imaging sensor 206 may also be disposed within the chassis 202. The camera 206 may be configured to capture images of the environment in visible light wavelengths, non-visible light wavelengths (such as infrared), or both. In some embodiments, the ARFN 102 may include multiple cameras used for different purposes. For example, in addition to a camera for capturing visual images within the environment, the ARFN 102 may also have an infrared camera for capturing infrared images of the environment.

The field of view of the camera 206 may be variable. In addition, the camera 206 may have rotation and panning capabilities, provided either through digital image manipulation or physical adjustment of the optical path.

The camera 206 may be used for various purposes, such as determining the location of the user 108, detecting user gestures, determining the positions of objects within the environment 100, reconstructing 3D characteristics objects within the environment 100, and so forth.

The projector 204 may also be used to project content onto content areas of the environment 100 for viewing by the users 108. In addition, the projector 204 may project patterns, such as non-visible infrared patterns, that can be detected by the camera 206 and used for three-dimensional (3D) reconstruction and modeling of the environment 100.

The chassis 202 may be mounted with a fixed orientation or be coupled via an actuator to a fixture such that the chassis 202 may move. Actuators may include piezoelectric actuators, motors, linear actuators, and other devices configured to displace or move the chassis 202 or components therein such as the projector 204 and/or the camera 206. The actuators may comprise a pan motor 208, tilt motor 210, a roll motor 212, and so forth. The pan motor 208 may be configured to rotate the chassis 202 in a yawing motion. The tilt motor 210 may be configured to change the pitch of the chassis 202, and the roll motor 212 may be configured to move the chassis 202 in a rolling motion. By panning, tilting and/or rolling the chassis 202, different views of the environment 100 may be acquired, and the projector 204 may be directed to different display areas within the environment 100.

One or more microphones 214 may be disposed within the chassis 202, or elsewhere within the environment 100. The microphones 214 may be used to acquire input from the user, for echolocation, location determination of a sound, or to otherwise aid in the characterization of and receipt of input from the environment.

The ARFN 102 may also have one or more speakers 216 for audible output. For example, the speakers 216 may be used to provide output from a text-to-speech module or to playback pre-recorded audio.

A transducer 218 may be present within the ARFN 102, or elsewhere within the environment, and configured to detect and/or generate inaudible signals such as infrasound or ultrasound. These inaudible signals may be used to provide for signaling between accessory devices and the ARFN 102.

A ranging system 220 may also be provided in the ARFN 102. The ranging system 220 may be configured to provide distance information from the ARFN 102 to a scanned object or set of objects. The ranging system 220 may also be used for object recognition and analysis. For example, the ranging system 220 may perform three-dimensional (3D) analysis of the environment 100 and objects within the environment 100. The ranging system 220 may utilize infrared, radar, light detection and ranging (LIDAR), ultrasonic ranging, stereoscopic ranging, structured light imaging, and so forth.

In this illustration, the computing device 104 is shown within the chassis 202. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 on the local area network, cloud resources accessible via a wide area network connection, or a combination thereof.

Additional resources external to the ARFN 102 may be accessed, such as resources in another ARFN 102 accessible via a local area network, network-based resources such as cloud processing and storage resources accessible via a wide area network connection, or a combination thereof. In still other instances, the ARFN 102 may couple to and control other devices within the environment, such as televisions, stereo systems, computing devices, communications devices, lights, and so forth.

In other implementations, the components of the ARFN 102 may be distributed in one or more locations within the environment 100. For example, the microphones 214 and speaker 216 may be distributed throughout the environment. The projector 204 and the camera 206 may also be located in separate chasses.

Referring again to FIG. 1, the workspace 110 may be projected from any one or more of the ARFNs 102. Areas onto which the workspace 110 is or may be displayed will be referred herein to as display areas. The area in which content is currently projected or displayed will be referred to as the current display area. Other areas in which the content may potentially be displayed will be referred to as potential display areas. In the example of FIG. 1, the tabletop 112 forms the current display area. Potential display areas may comprise one or more of the walls 114, the passive display medium 116 held by one of the users 108(b), and the tablet computer 118 held by another of the users 108(c).

Figure 3:
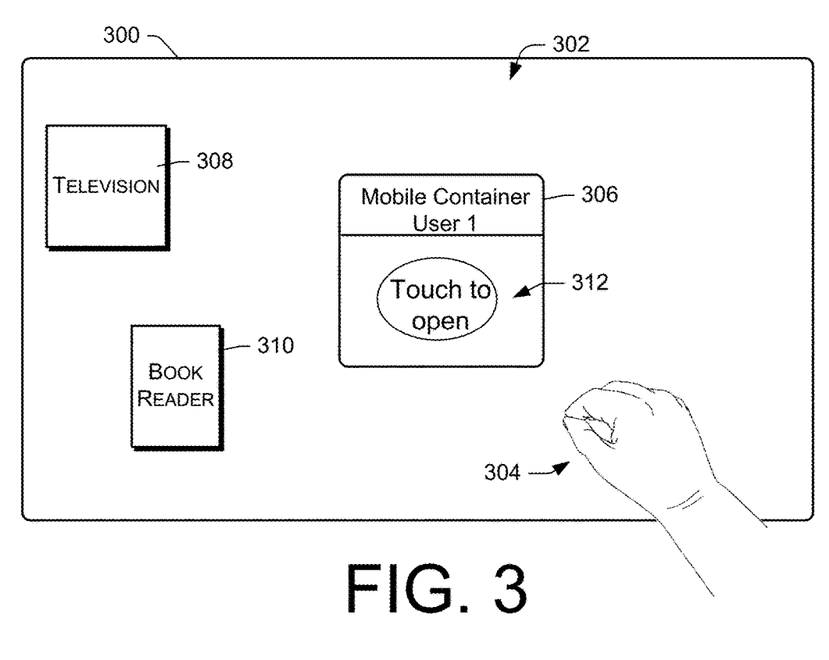
FIG. 3 shows an example of a multiple user workspace and how the identification of a user causes an instance of a user-specific container to appear for that user.

FIG. 3 shows an example of a multiple user environment 300 having a workspace 302 in which a user 304 is identified. In this instance, the user is identified via the user's hand and, in response, an instance of a user-specific container in the form of a mobile container 306 is displayed for that user 304. The user 304 can be recognized through biometric identification, electronic means such as specialized ring bracelet warn by the user 304, by unique gestural actions by the user, or by other means as known to one of skill in the art. Also illustrated in the workspace 302 are other applications such as a television 308 and book reader 310 that the user 304, or other users within the workspace, can also interact with.

Figure 4:
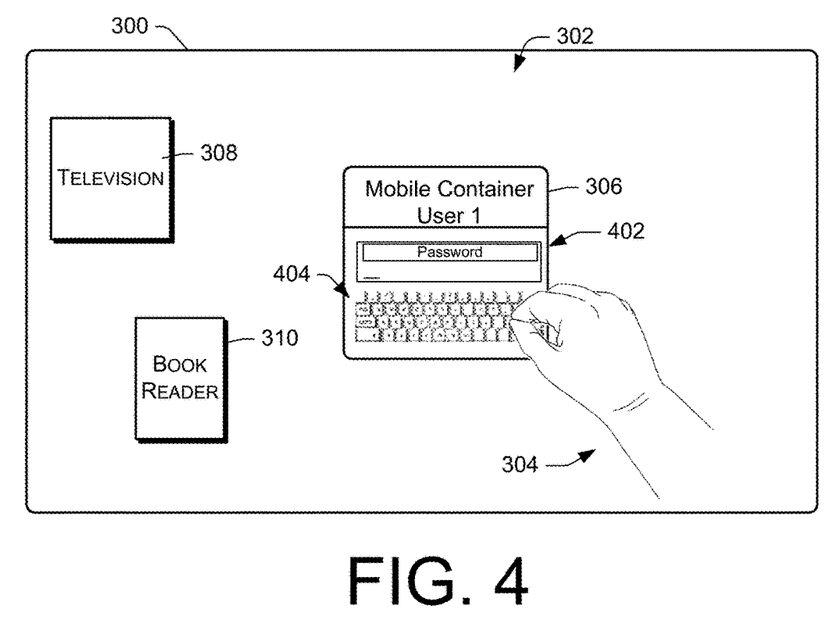
FIG. 4 shows an example of the container for the user requiring further authentication for use by the user.

The mobile container 306 can be a virtual machine instance (VMI) located either locally or on network-based resources such as those in the cloud, or can be an individual application, such as a word processing application (shown in FIG. 4). The mobile container 306 can likewise be a data container, such as a simple drop-and-store icon that the user 304 can drag other items in the workspace, such as book reader 310 or content therein, and drag the content to the mobile container 306 icon for storage that will be later accessible to the user 304, potentially at different locations from the workspace 300 where the data or content was originally stored from.

The mobile container 306 has a predetermined set of attributes at least regarding how the user 304 will interact with the instance of the mobile container 306 and how the detection of other users attempting to interact with the mobile container 306 is handled. The security attributes of the mobile container can be from no security at all to restriction of the environments in which the mobile container 306 is allowed to open in, e.g. public or private settings, or not within the presence of other detected users. Security and access policies for applications and data as known in the art can be applied to govern the interaction and behavior of the mobile container 306.

Once the system has detected that the user 304 has placed his or her hand into the workspace 300, the embodiment of the mobile container in FIG. 3 shows a "touch to open" icon 312 to the user 304 such that the user 304 is aware of the availability of the mobile container 306 and can affirmatively indicate the desire to open it. Upon interacting with the touch to open icon 312, either through touching or proximity, the authentication of the user 304 will occur if the predetermined attributes of the mobile container 306 require the authentication as is shown in FIG. 4.

FIG. 4 shows an example of an instance of the mobile container 306 for the user 304 requiring further authentication prior to use by the user 304. In this example, a password 402 is requested in order for the user 304 to have access to the container 306. A virtual qwerty keyboard 404 is provided to the user 304 to interact with and enter the requisite password for access, and interaction can be touching or movement dependent upon the interactive nature of the multiple user environment 300. In other embodiments, other methods of identifying the user 304 can be used either instead of, or in conjunction with, the password 402, such as biometric identification, etc.

Figure 5:
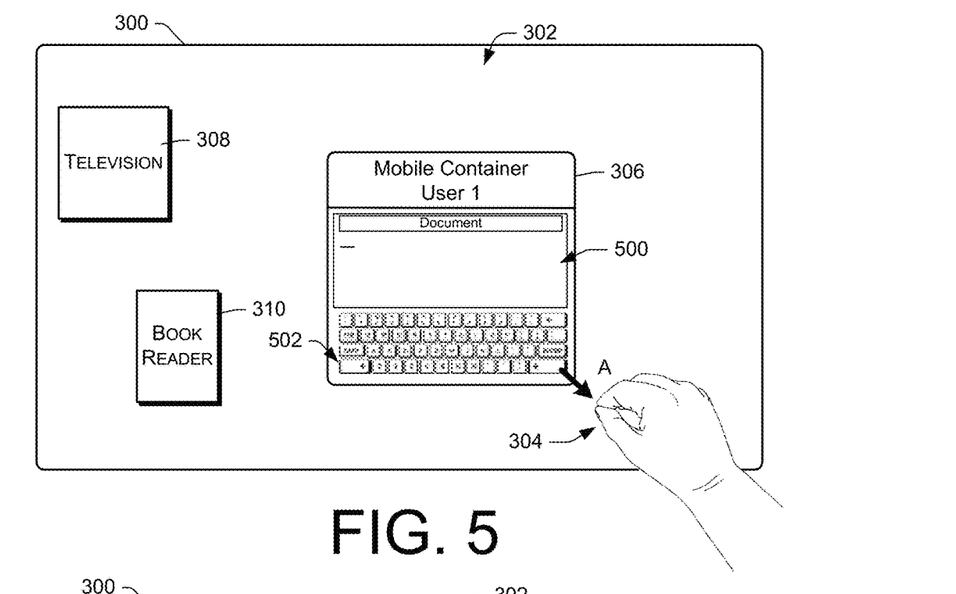
FIG. 5 shows an example of the opened container being enlarged by the user for the creation of a document.

Once the user 304 types in the requisite password 402, or otherwise meets whatever authentication criteria is present, the functionality of the mobile container 306 is made available to the user 304 as shown in FIG. 5. The predetermined attributes, if any, for the mobile container 306 will also be enforced starting upon the opening or activation thereof.

FIG. 5 shows an example of an instance of the opened mobile container 306 being enlarged by the user 304, through motion in the direction of Arrow A. As illustrated, the mobile container includes a document 500 and enlarging increases the size of the document 500. The enlarging of the mobile container 306 likewise enlarges the virtual qwerty keyboard 502 such that the user 304 can more easily type thereupon to create the document 500.

Figure 6:
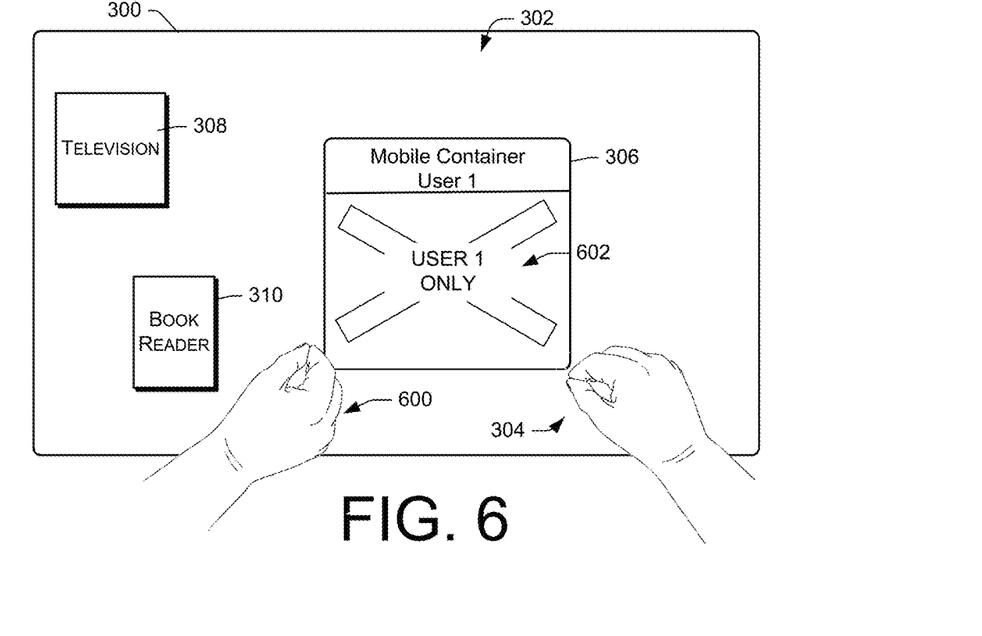
FIG. 6 shows an example of the detection of an unauthorized second user in proximity to the container and the blocking of container interaction to the second user.

FIG. 6 shows an example of the detection of an unauthorized second user 600 in proximity to the mobile container 306. When the system, such as node 102, detects an unauthorized user 600 (or potentially any other user) coming close to interacting with the mobile container 306, the system blocks access to the mobile container 306 to the second user 600 according to predetermined attributes of the mobile container 306. A freeze screen 602 is therefore shown within the mobile container 306 that prevents the second user 600 from interacting with the virtual qwerty keyboard 502 in FIG. 5, and can also serve to alert the authorized user 304 that the system has detected a person trying to interact with the mobile container 306.

The predetermined attributes for the second user 600 can be variable as well. Thus, the second user 600 can be completely blocked from access or only a portion of the container may be blocked. In one example, user 304 can indicate in the application of the mobile container 306, such as with the document 500 shown in FIG. 5, that the second user can have access to the document 500 (e.g., for editing purposes). Another example of limited access would be that the second user 600 can only have access if user 304 is not within the environment, thereby preventing a conflict of user control for the mobile container 306.

Figure 7:
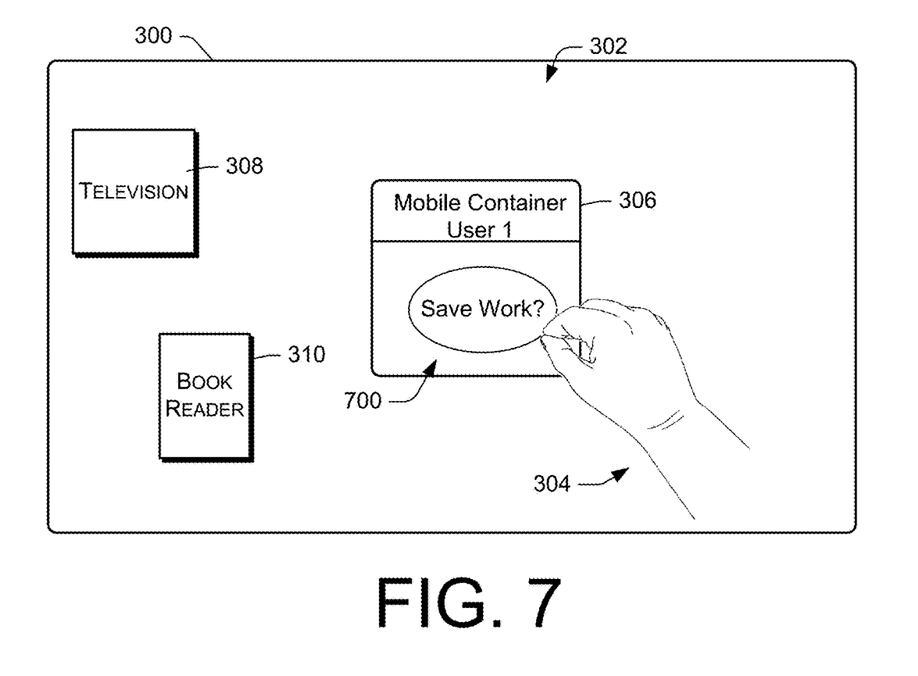
FIG. 7 illustrates the closing of the container and optional storage of data therein by the user.

FIG. 7 illustrates the closing of the mobile container 306 and optional storage of data therein by the user 304. Here, the mobile container 306 allows the user 304 to save work through interaction with a "save work" icon 700 within the mobile container 306. The data can be saved locally on node 102 or at network-based storage resources, whereby the user 304 can access the mobile container 306 and save data potentially at another location and within another environment different from the environment 300. As such, the container 306 may be deemed a "mobile container" 306.

In some instances, however, the mobile container 306 does not have to be mobile or portable to other platforms. The mobile container 306 can be embodied as a resident storage or application, or can even be a temporary program instance with no storage or long-term storage. One example of such temporary application would be a teleconference or other communication application that need only to be instantiated for the communication.

Figure 8:
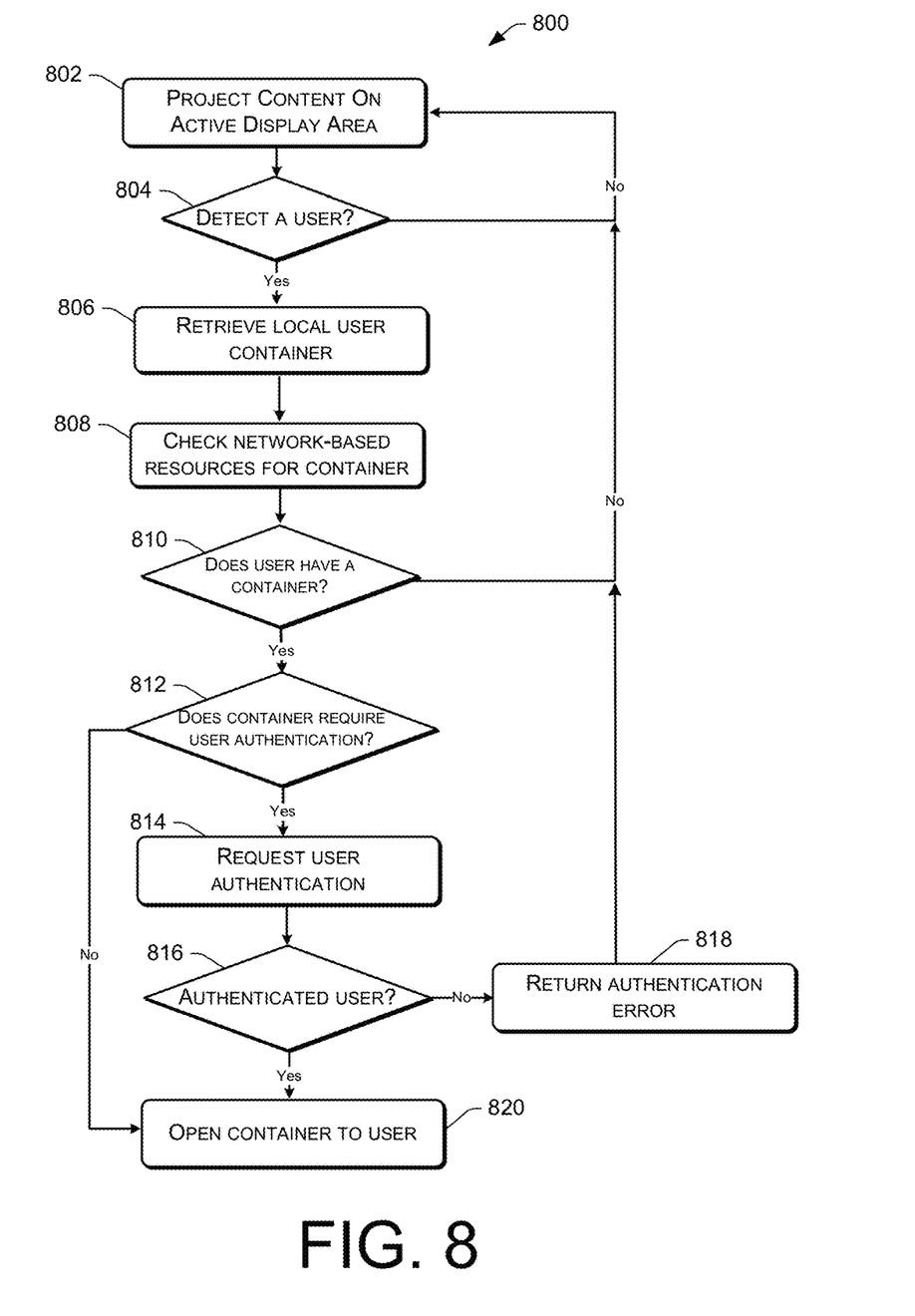
FIG. 8 is a flow diagram of detecting a user within the environment and obtaining and opening a container for the user.

FIG. 8 is a flow diagram of a process 800 for detecting a user 304 within the environment 300 and obtaining and opening a mobile container 306 for the user 304. In this embodiment, content is projected on the an active display area, such as the workspace 302, as shown at step 802, and then a determination is made as to whether a user, such as user 304, is detected within the environment 300, as shown be decision 804. If there is not a user detected at decision 804, then the process iterates to again project content at step 802.

Otherwise, if the user 304 has been detected at decision 804, one or more local containers, such as mobile container 306, are located and retrieved if present, as shown by step 806. Any non-local container can also be located, such as those residing on any network-based resources, as shown at step 808. Thus, in one embodiment, the mobile container 306 could be a VMI resident on cloud based resources that the process locates and retrieves to have executed or represented in the workspace 302. Furthermore, the location and retrieval steps 806 and 808 can likewise occur only singly, i.e. no non-local or only non-local searching, or in combination as shown.

After the one or more containers are retrieved from steps 806 and 808, a determination is made as to whether a container for the user has been located, as shown at decision 810. If no container was located for the user at decision 810, then the process again iterates to displaying content at step 802. Otherwise, if a container has been located at decision 810, a determination is then made as to whether the container requires user authentication as shown at decision 812. This predetermined criteria of user authentication prior to opening the container may be set by preference. The embodiment of the mobile container 306 shown in FIG. 4 is illustrative of this feature where a password 402 is required to access the mobile container 306. Other security determinations, such as the nature of the workspace or environment that the container is to be opened in, can likewise be made at this determination.

If no user authentication is required at decision 812, then the container is opened to the user, as shown at step 820. Otherwise, if user authentication is required at decision 812, then the user is requested to provide the required authentication as shown at step 814, such as the password request shown in FIG. 4. A determination is then made as to whether the user has properly authenticated himself or herself, as shown at decision 816. If the user is properly authenticated at decision 816, then the container is opened to the user, as shown at step 820. Otherwise, if the user is not properly authenticated at decision 816, then an error in authentication is returned to the user as shown at step 818, and the process again iterates to display content at step 802. It should be noted that the process 800 can iterate to open multiple containers for a user in the environment 300, and can operate in parallel to accommodate multiple users with the environment 300 where each has their own associated containers.

Figure 9:
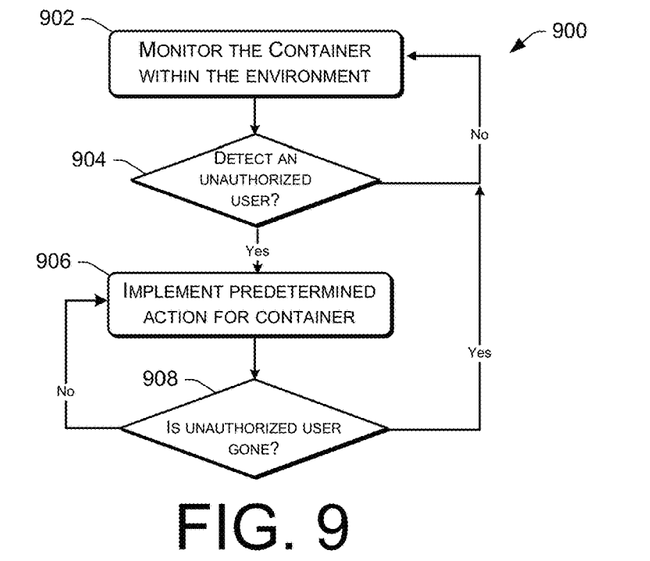
FIG. 9 is a flow diagram of the monitoring of the environment for unauthorized intrusion of other users attempting to interact with the container of the user for which it was opened.

FIG. 9 is a flow diagram of one embodiment of a process 900 for monitoring of the environment 300 for unauthorized intrusion of other users, such as second user 600 in FIG. 6, attempting to interact with the mobile container 306 of the user 304 for which it was opened. The mobile container 306 is monitored within the environment 300, as shown at step 902. This monitoring could be accomplished, for example, by the camera 206 of node 102 capturing images within the environment 300, or by the means used to otherwise detect users within the environment 300. After or while monitoring at step 902, a determination is then made as to whether an unauthorized user is detected within the environment 300, as shown at decision 904.

If an unauthorized user is not detected at decision 904, then the process iterates to monitor the environment 300 at step 902. Otherwise, if an unauthorized user is detected as decision 904, then the predetermined action for that mobile container is implemented as shown at step 906. Thus, as shown in FIG. 6, the predetermined action is indicating that interaction by the unauthorized user with the mobile container 306 is prohibited. Once the predetermined action has been implemented at step 906, a determination is then made as to whether the unauthorized user is gone from the environment 300, as shown at decision 908. If the unauthorized user is not gone at decision 908, the process iterates to implement the predetermine action at step 906. In the embodiment of FIG. 6, the freeze screen 602 will remain displayed until the second user 600 is no longer detected. Otherwise, on the unauthorized user is gone at decision 908, the process 900 again iterates to monitor the environment as step 902 to maintain security for the container.

Figure 10:
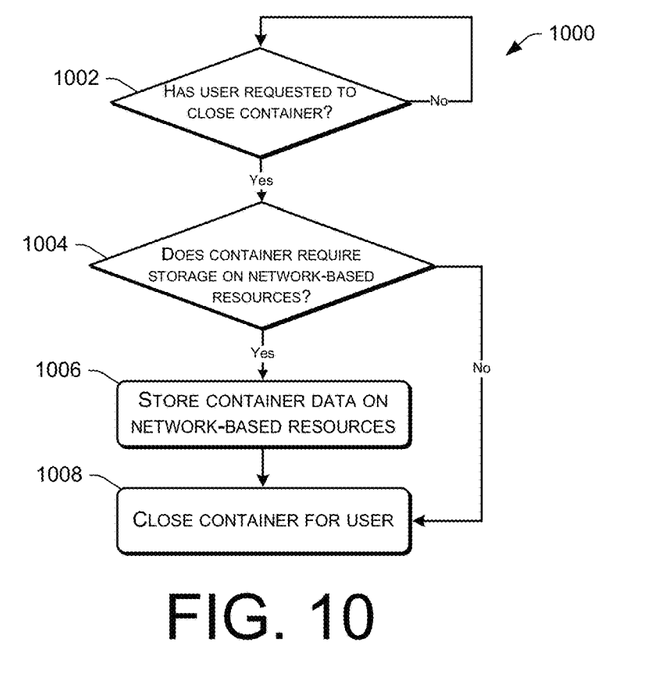
FIG. 10 is a flow diagram of closing the container and storing any data therefrom on network-based resources.

FIG. 10 is a flow diagram of one embodiment of the process 1000 closing the mobile container 306 and storing any data therefrom on network-based resources, which is also illustrated in the embodiment of the mobile container 306 in FIG. 7. A determination is made as to whether the user, such as user 304, has requested to close the container, as shown at decision 1002. If the user has not requested to close the container, the process 1000 iterates at decision 1002 to await the close request. Once the user has requested to close the container at decision 1002, a determination is then made as to whether the container requires storage locally or on network-based resources, as shown as decision 1004. If storage on network-based resources is not required at decision 1004, then process 1000 then closes the container for the user as shown at step 1008.

Otherwise, if the container requires network-based storage at decision 1004, then the container is stored on network-based resources as shown at step 1006, and then the container is closed for the user at step 108. The storage step can be closed-ended in that data is simply stored on cloud resources, or if the container is an active VMI, the VMI can stay active within the cloud and simply have its status updated that it is no longer accessible to the user within this specific environment.

One example of the usage of the mobile container 306 on network-based resources is to allow a user, such as user 304, to move data and applications as containers within multiple and single user environments. Thus, in one example, if the container is embodied as a mobile shopping cart, a user can place an item in the cart on their local computer, where the cart is located on cloud based resources, and then go to a multiple user environment, such as a kiosk at a mall or other shopping site. Utilizing the processes described herein, the kiosk will then recognize the user, locate the shopping cart, and display that cart to the user with the items previously placed therein.

In this example, the kiosk can then tell the user where in the mall or shopping location the item can be found. Furthermore, the process can be done in the reverse, where the user at a shopping location can place items into the shopping cart that has been located at the mall, through a variety of means such as typed or spoken names, pictures, bar code scans, etc., and the shopping cart will then store the item data and make the data later available to the user in the single user environment setting, such as desktop computer, such that the user can effect online purchase of the item.

Note that the various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more processors; and
one or more non-transitory computer-readable media storing computer-executable instructions that, when executed by the one or more processors, cause the one or more processors to perform acts comprising:
causing a projector to present first content on a display area within an environment;
receiving, from an image sensor, image data corresponding to an image of the environment;
determining, based at least in part on the image data, that a first user is present within the environment;
determining an identity of the first user;
determining, based at least in part on the image data, a location of the first user within the environment;
identifying at least one container associated with the first user, the at least one container including an interactive data storage structure;
identifying, based at least in part on the at least one container, a first predetermined access attribute associated with the at least one container;
receiving authentication data to access the at least one container, wherein the authentication data satisfies the first predetermined access attribute associated with the at least one container;
causing display of second content associated with the at least one container, the second content being different than the first content, and wherein causing display of the second content is based at least in part on:
the location of the first user within the environment; and
the authentication data satisfying the first predetermined access attribute associated with the at least one container; and
causing, based at least in part on determining that a second user associated with a second predetermined access attribute is attempting to interact with the second content, display of third content that includes an indication of access restrictions instead of at least a portion of the second content.

2. The system of claim 1, wherein the at least one container is stored on network-based resources.

3. The system of claim 1, wherein the second content associated with the at least one container is displayed on a predetermined area within the environment.

4. The system of claim 1, wherein the at least one container is accessible to other network-based resources.

5. The system of claim 1, wherein the second content associated with the at least one container is selectively displayable to the first user based at least in part on attributes of the environment.

6. A system comprising:
one or more processors; and
one or more non-transitory computer-readable media storing computer-executable instructions that, when executed by the one or more processors, cause the one or more processors to perform acts comprising:
receiving image data representing a multiple-user environment;
determining an identity of a first user in the multiple-user environment;
identifying a container associated with the first user, the container being associated with first access attributes for the first user;
causing display of first content associated with the container within the multiple-user environment;
enabling the first user to access the container based at least in part on the first access attributes;
determining an identity of a second user in the multiple-user environment;
determining that the second user is unauthorized to access the container based at least in part on second access attributes for the second user; and
causing, based at least in part on determining that the second user is unauthorized to access the container, display of second content that includes an indication of access restrictions instead of at least a portion of the first content.

7. The system of claim 6, the acts further comprising receiving the container from network-based resources.

8. The system of claim 6, the acts further comprising causing the first content to be displayed on a predetermined area within the multiple-user environment.

9. The system of claim 6, the acts further comprising causing the container to be accessible to other network-based resources.

10. The system of claim 6, wherein causing display of the first content is based at least in part on attributes of the multiple-user environment.

11. The system of claim 6, the acts further comprising:
authenticating the first user; and
wherein causing display of the first content is based at least in part on authenticating the first user.

12. The system of claim 6, the acts further comprising:
causing the first content to be displayed on a display area within the multiple-user environment; and
receiving image data corresponding to an image of the multiple-user environment, the image depicting the first user within the multiple-user environment.

13. A system comprising:
one or more processors; and
one or more non-transitory computer-readable media storing computer-executable instructions that, when executed by the one or more processors, cause the one or more processors to perform acts comprising:
causing an instance of a container to be retrieved, the container being selectively accessible to a first user in a multiple-user environment and having first access attributes associated with the first user, and wherein the container includes at least one data storage structure;
causing, during a first period of time, display of first content associated with the container within the multiple-user environment, wherein causing the display of the first content associated with the container is based at least in part on the first access attributes such that the container is accessible to the first user;
identifying, during a second period of time, a second user within the multiple-user environment, wherein the first period of time and the second period of time at least partially overlap;
determining second access attributes associated with the second user;
determining, based at least in part on the second access attributes, that the second user is not authorized to access the container; and
causing, based at least in part on determining that the second user is not authorized to access the container, display of second content that includes an indication of access restrictions instead of at least a portion of the first content.

14. The system of claim 13, the acts further comprising:
authenticating the first user; and
wherein causing display of the first content is based at least in part on authenticating the first user.

15. The system of claim 1, wherein determining the location comprises determining the location based at least in part on identifying a flat surface adjacent to the first user.

16. The system of claim 13, the acts further comprising causing display of an alert based at least in part on the determining that the second user is not authorized to access the container.

17. The system of claim 13, the acts further comprising:
determining that the first user is no longer present in the multiple-user environment; and
causing display of a user interface associated with the container based at least in part on the first user no longer being present in the multiple-user environment.

18. The system of claim 1, further comprising:
identifying display areas to display the second content;
selecting, based at least in part on the location of the first user, a display area of the display areas, and
wherein causing display of the second content includes causing display of the second content on the display area.

19. The system of claim 1, wherein causing the projector to present first content is based at least in part on the first user being within a predefined area of the environment.

20. A method comprising:
receiving image data representing a multiple-user environment;
determining an identity of a first user in the multiple-user environment;
identifying a container associated with the first user, the container being associated with first access attributes for the first user;
causing display of first content associated with the container within the multiple-user environment;
enabling the first user to access the container based at least in part on the first access attributes;
determining an identity of a second user in the multiple-user environment;
determining that the second user is unauthorized to access the container based at least in part on second access attributes for the second user; and causing, based at least in part on determining that the second user is unauthorized to access the container, display of second content that includes an indication of access restrictions instead of at least a portion of the first content.

21. The method of claim 20, comprising causing the first content to be displayed on a predetermined area within the multiple-user environment.

22. The method of claim 20, further comprising causing the container to be accessible to other network-based resources.

23. The method of claim 20, wherein causing display of the first content is based at least in part on attributes of the multiple-user environment.

24. The method of claim 20, further comprising:
authenticating the first user, wherein causing display of the first content is based at least in part on authenticating the first user.

25. The method of claim 20, further comprising:
causing the first content to be displayed on a display area within the multiple-user environment; and
receiving image data corresponding to an image of the multiple-user environment, the image depicting the first user within the multiple-user environment.

* * * * *